Patented Feb. 4, 1936

2,029,988

UNITED STATES PATENT OFFICE 2,029,988

METHOD AND MATERIAL FOR IMPROVING THE GROWTH OF PLANTS

William B. Doe, Jacksonville, Fla.; Flora N. Doe, administratrix of the estate of said William B. Doe, deceased, assignor to The Hydro-Humus Corporation of America, Jacksonville, Fla., a corporation of Florida No Drawing. Application June 10, 1935, Serial No. 25,945

12 Claims. (Cl. 47—58)

The present invention relates to the art of improving or promoting the growth of plants, trees, shrubs and other vegetation by the use of palmetto wood, and the palmetto wood materials adapted to be employed for such purposes.

One of the primary objects of the invention is to provide a method of promoting the growth of plants, trees, shrubs and other vegetation which comprises placing a material consisting of palmetto wood, which is very inexpensive and highly absorptive to moisture, in the soil around or adjacent to the roots of the plants, trees, shrubs and other vegetation to serve as a medium for the absorption and storage of water or of moisture and fertilizers and plant foods and for the supply thereof to the growing vegetation, such material being subject to subsequent decay and conversion into humus which will serve as a plant food of high fertilizing properties. While thus serving as a food and moisture storehouse to the growing vegetation it prevents the leaching of valuable fertilizers into soil strata below the feeder roots and thereby brings about efficiency and economy in the fertilization of growing vegetation.

Another object of the invention is to provide a method for the purpose stated which comprises placing palmetto wood or fiber mixed with a fertilizer or plant food or having a fertilizer or plant food absorbed therein, in the soil adjacent to the roots of plants, trees, shrubs and other vegetation whereby such fertilizer or plant food will be supplied, when moistened, to the roots of the growing plants, trees, shrubs or other vegetation.

Another object is to provide a plant food and fertilizing material comprising palmetto wood or fiber which is inexpensive, highly absorptive to moisture and which is readily convertible by natural elements into humus and plant food of high fertilizing properties.

Another object is to provide a plant food and fertilizing material comprising palmetto wood or fiber having a fertilizer or plant food absorbed therein.

Another object is to provide palmetto wood or fiber having high moisture absorptive properties as an organic filling material for fertilizers.

Another object of the invention is to provide a plant food and fertilizing material which comprises humus resulting from decomposition of palmetto wood or fiber.

A further object of the invention is to provide a plant food and fertilizing material which comprises humus resulting from decay of palmetto wood or fiber and a fertilizer mixed therewith.

The present invention enables wood of the palmetto tree and other palm trees, and more especially of the species thereof known as "cabbage palmetto" to be utilized advantageously as a means for storing moisture and/or a fertilizer or plant food in the soil adjacent to the roots of plants, trees, shrubs or other vegetation to improve or promote the growth thereof. Large forests of these trees are found in certain sections of the United States but the wood thereof has been heretofore regarded as practically valueless for industrial purposes and the growth of these trees, usually upon fertile soil, has precluded the use thereof for the production of valuable crops thereon, and the cost of removing such trees has been prohibitive. The wood from the palmetto tree however, consists of coarse hard fibers in a body of soft pith, and I have found that it possesses high liquid absorptive properties, it being capable of holding about four or five times its weight of water or other liquid, and also, the wood of the palmetto tree, which is actually classed as a plant, is subject to rapid decay by the natural elements of the soil for conversion into humus which itself is a fertilizer or plant food.

The present invention enables these properties of the wood or fibers of palmetto trees to be utilized in improving or promoting the growth of plants, trees, shrubs and other vegetation. The high liquid absorptive properties of such wood enable it to be used for the storage of moisture, as in sandy or other dry soil, and of fertilizers and other soluble plant feeding substances through absorption or osmosis, and diffusion or distribution thereof by absorption or osmosis, around or adjacent to the roots of the plants, trees, shrubs or the like, for extraction by the roots thereof, and the property of such wood of readily decomposing or decaying enables its conversion into humus to fertilize or feed the plant or other vegetation.

In carrying out the present invention, the wood or fiber of the trunk of the palmetto tree is cut cross-wise of its fibers into small chips or pieces, such for example, as would be known in the lumber industry as "hoggings" or "chippings".

The invention may be carried out according to the following examples:—

1. The chips or pieces of the palmetto wood or fiber, prepared as just described, may be buried in the soil from about six to twelve inches below the surface thereof and around the roots of the plants, trees, shrubs or other growing vegetation the growth of which is to be promoted or improved. Moisture applied to the surface of the soil above the pieces of wood, either by artificial wetting or by rains, will seep through the soil and be absorbed by the chips or pieces of wood, so that the pieces of wood, due to their large water holding capacity, will maintain a supply of moisture therein which will be extracted therefrom by the roots of the plants, trees or other growing vegetation. This method of carrying out the invention is particularly advantageous for maintaining a supply of moisture for promoting or improving the growth of plants or other vegetation in sandy or other soils which rapidly dry out.

2. The pieces of palmetto wood, cut into chips or pieces as described, and in either a wet or dry condition, may be buried in the soil from about six to twelve inches below the surface thereof and around the roots of the growing plants, trees, shrubs or other vegetation, and any soluble fertilizer or plant food of any of the usual and well known kinds, such for example as nitrate of soda, sulphate of ammonia, muriate of potash or phosphates, may be placed on the surface of or in the soil above the pieces of palmetto wood or fiber buried therein, and moisture applied to the surface of the soil, either by artificial wetting or by rains, will dissolve the fertilizer or plant food and carry the same downwardly through the soil where it will be absorbed by the pieces of palmetto wood if dry, or will become impregnated with the fertilizer or plant food by osmosis if the pieces of wood are already moist, the pieces of wood around or adjacent to the roots of the plants, trees, shrubs or other growing vegetation thus storing and maintaining a supply of fertilizer or plant food therein for ready extraction therefrom by the roots of such plants or other vegetation.

3. A suitable quantity of the chips or pieces of palmetto wood or fiber, in either dry or wet condition, may be placed in any suitable container in which any well known or desired water-soluble chemical fertilizers or plant foods have been dissolved in water, and the chips or pieces of said wood submerged in and allowed to soak up such solution or mixture or to become impregnated therewith by osmosis. The solution or mixture of fertilizers or plant foods may consist, for instance, of water and nitrate of soda, sulphate of ammonia, muriate of potash, and phosphoric acid or phosphates from which phosphoric acid may be derived, or any one or more of these or other soluble plant foods, preferably in a proportion to form a saturated solution. The pieces of wood, after being allowed to soak in such solution until thoroughly saturated or impregnated with the plant food, may then be removed from the container and buried in the soil around the roots of the plant, tree or shrub, the feeder roots of which will readily extract the plant foods in the pieces of wood, due to the moisture contained therein. If desired, the pieces of wood after being soaked or impregnated with the plant food as just described, may be allowed to dry by evaporation of the moisture therefrom, so that they will be in suitable condition for shipment or storage until used, and the pieces of wood impregnated with the plant food, may be buried in the soil around the roots of the plants, trees or shrubs, and water applied to the surface of the soil, either by artificial wetting or by rains, will be absorbed by the pieces of wood and will dissolve the plant food impregnating the wood and thus place it in condition for extraction by the roots of the plants, trees or shrubs.

In each of the foregoing examples, the palmetto wood or fiber, which is buried in the soil and is susceptible to rapid decay or decomposition by the natural elements in the soil, will itself be readily converted into humus and plant foods of high fertilizing properties which will be situated for extraction by the roots of the plant, tree or shrub to further improve or promote the growth thereof.

4. The palmetto wood or fiber may be ground or otherwise reduced to a suitable degree of fineness and intimately mixed with fertilizing or plant food materials, such as those hereinbefore mentioned, in either liquid or solid form, and a quantity of such mixture, substantially equal to the quantity of ordinary fertilizer usually used, may be buried in the ground around the roots of the plants, trees, shrubs or other growing vegetation, said wood or fiber serving as a filling material in place of the usual dolomitic limestone or other organic filling material heretofore employed with fertilizers and possessing the advantages thereover of being highly absorptive to water and therefore capable of absorbing and maintaining a supply of moisture around the roots of the growing vegetation and of maintaining the fertilizing or plant food materials in a moist condition so that they may be extracted readily by the roots of the vegetation by osmosis, and of being eventually converted by the natural elements in the soil into humus to serve as a fertilizer or plant food for the growing vegetation. The wood is preferably ground sufficiently fine to readily mix with the fertilizing or plant food material in granular form but not so fine as to destroy the cellular structure of the wood so that it will retain its high moisture-absorptive properties, and the wood and fertilizing or plant food materials are preferably mixed while dry, especially when the mixture is to be stored or shipped, to avoid moisture in the mixture which might cause decomposition and consequent loss of some of the constituents of the fertilizing and plant food materials.

5. The pieces of palmetto wood or fiber may be placed in a pile and kept in a suitably moist condition and allowed to decompose or decay for a period of about three to six months, depending upon the temperature and other weather conditions, and thus converted by the "decomposition" method into humus, and the latter may then be used alone or may be mixed with any usual or well known fertilizers or plant foods, such for instance, as those mentioned in Example 3 and in any desired proportions, and the humus or resulting mixture may be buried in the soil around the roots of the plants, trees, shrubs or other growing vegetation.

Palmetto wood is particularly suitable for use in carrying out the present invention by reason of the high liquid absorbing properties of the pithy body of such wood which forms the major portion thereof, and the coarse hard fibers which are embedded in the pithy body and extend in a substantially parallel direction therein have high liquid absorbing properties and serve to hold the pithy body together so that the pieces of this wood will substantially maintain their form during handling and until placed in the soil, this being particularly advantageous when the pieces of wood are soaked in a solution of chemical fertilizers or plant foods to saturate or impregnate them therewith.

Palmetto wood is readily decomposable, by fermentation of the carbohydrates which constitute about 65% thereof, into humus which substantially retains the high liquid absorptive properties of this wood in its natural state, since its decomposition into humus does not destroy the cellular structure of the natural wood, so that when the humus is used, either alone or in association with fertilizing or plant food materials, it serves to maintain a supply of moisture for absorption by the roots of the growing vegetation. While the humus itself is a plant food of high value, the palmetto wood when used in its natural state, either alone or associated with fertilizing or plant food materials, also has some fertilizing or plant food value and properties due to the carbohydrate constituent thereof which is soluble in water and is in a condition to be absorbed by the roots of the growing vegetation around which it is placed.

The preferred methods of carrying out the invention are set forth in the foregoing examples, but it will become apparent that the high liquid absorbing capacity of the palmetto wood and its property of readily decomposing or decaying into humus will adapt it to other methods of application to growing plants, trees, shrubs and any other kinds of vegetation to improve the growth thereof, and such are intended to be included within the scope of the claims.

I claim as my invention:—

1. The method of improving the growth of plants, trees, shrubs and other vegetation which comprises placing in the soil surrounding the roots thereof pieces of palmetto wood which have been cut into comparatively short lengths to expose the ends of the fibers thereof and provide a highly absorbent mass.

2. The method of improving the growth of plants, trees, shrubs and other vegetation which comprises placing in the soil around the roots thereof pieces of palmetto wood impregnated with a soluble plant food.

3. The method of improving the growth of plants, trees, shrubs and other vegetation which comprises placing in the soil around the roots thereof pieces of palmetto wood and applying plant food to soil above the pieces of wood for wetting and absorption by said pieces of wood.

4. For use in improving the growth of plants, shrubs and other vegetation and adapted to be placed in the soil around the roots thereof, a mixture of decayed palmetto wood and plant foods.

5. The method of making fertilizing material which comprises causing pieces of palmetto wood to decay to form humus, by cutting palmetto wood into short shreds, dust, or slivers, and maintaining the same under aerobic and moistened condition.

6. The method of making fertilizing material which comprises causing pieces of palmetto wood to decay to form humus, and mixing such humus with fertilizing substances.

7. A material for improving the growth of plants, trees, shrubs and other vegetation comprising palmetto wood cut into comparatively short lengths to expose the ends of the fibres thereof and provide a highly absorbent mass.

8. A fertilizing material for growing plants, trees, shrubs and other vegetation comprising palmetto wood and a plant food associated in cooperating relationship.

9. A fertilizing material for growing plants, trees, shrubs and other vegetation comprising palmetto wood having a soluble plant food absorbed therein.

10. A fertilizing material for plants, trees, shrubs and other vegetation consisting of decayed palmetto wood, made by cutting palmetto wood into short shreds, dust or slivers, and maintaining the same in a pile under aerobic and moistened conditions.

11. A fertilizing material for plants, trees, shrubs and other vegetation comprising a mixture of fertilizing agents and a filler consisting of palmetto wood.

12. A fertilizing material for plants, trees, shrubs and other vegetation comprising a mixture of decayed palmetto wood and plant food.

WILLIAM B. DOE.